(12) United States Patent
Swift

(10) Patent No.: US 10,173,876 B2
(45) Date of Patent: *Jan. 8, 2019

(54) DE-CENTRALIZED OPERATIONAL INDICATOR SYSTEM FOR A MATERIALS HANDLING VEHICLE

(71) Applicant: Crown Equipment Corporation, New Bremen, OH (US)

(72) Inventor: Philip W. Swift, Oakwood, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,752

(22) Filed: Nov. 20, 2017

(65) Prior Publication Data
US 2018/0086615 A1 Mar. 29, 2018

Related U.S. Application Data

(63) Continuation of application No. 15/446,329, filed on Mar. 1, 2017, now Pat. No. 9,821,991, which is a
(Continued)

(51) Int. Cl.
*B66F 17/00* (2006.01)
*B60Q 5/00* (2006.01)
(Continued)

(52) U.S. Cl.
CPC .............. *B66F 17/003* (2013.01); *B60Q 1/50* (2013.01); *B60Q 5/005* (2013.01); *B60Q 5/006* (2013.01);
(Continued)

(58) Field of Classification Search
CPC .......... B60Q 1/50; B60Q 5/006; B60Q 9/008; B66F 9/0755; B66F 17/003
(Continued)

(56) References Cited

U.S. PATENT DOCUMENTS 2,023,845 A 12/1935 LaRose
4,115,757 A 9/1978 Blahunka
(Continued)

FOREIGN PATENT DOCUMENTS

AU 2014200672 A1 10/2014
CN 2191204 Y 3/1995
(Continued)

OTHER PUBLICATIONS

Ross, Kenneth; International Preliminary Report on Patentability and Written Opinion of the International Searching Authority dated Oct. 21, 2015 for PCT/US2015/045660; The International Bureau of WIPO.
(Continued)

*Primary Examiner* — Ojiako K Nwugo
(74) *Attorney, Agent, or Firm* — Stevens & Showalter, LLP

(57) ABSTRACT

A materials handling vehicle comprises an operator compartment, forks that can be raised and lowered to carry a load, a power unit, an outward facing output module, and a controller. The outward facing output module comprises an indicator directed away from an operators' compartment of the materials handling vehicle. In operation, the controller receives information from at least one of a remote server, and electronics of the materials handling vehicle, via a materials handling vehicle network bus, where the received information is in regard to a task being performed by the materials handling vehicle. Also, the controller, responsive to detecting the task being performed, operates the indicator of the outward facing output module to provide situational awareness information with regard to the task.

20 Claims, 6 Drawing Sheets

Related U.S. Application Data continuation of application No. 14/828,828, filed on Aug. 18, 2015, now Pat. No. 9,617,134.

(60) Provisional application No. 62/039,138, filed on Aug. 19, 2014.

(51) Int. Cl.
*B60Q 9/00* (2006.01)
*B66F 9/075* (2006.01)
*B60Q 1/50* (2006.01)

(52) U.S. Cl.
CPC ............... *B60Q 9/00* (2013.01); *B60Q 9/008* (2013.01); *B66F 9/0755* (2013.01)

(58) Field of Classification Search
USPC ........................................................ 340/435
See application file for complete search history.

(56) References Cited

U.S. PATENT DOCUMENTS

| | | | |
|---|---|---|---|
| 4,849,735 A | 7/1989 | Kirtley et al. | |
| 5,131,801 A * | 7/1992 | Melanson ............... | B66F 9/082 33/366.26 |
| 5,572,202 A | 11/1996 | Regel et al. | |
| 5,697,755 A * | 12/1997 | McCauley ............... | B66F 9/082 116/303 |
| 5,905,434 A | 5/1999 | Steffan et al. | |
| 5,944,406 A | 8/1999 | Hansen | |
| 6,029,102 A | 2/2000 | Elsman | |
| 6,220,737 B1 | 4/2001 | Baragona | |
| 6,411,210 B1 | 6/2002 | Sower et al. | |
| 6,834,395 B2 | 12/2004 | Fuentes | |
| 7,315,235 B1 | 1/2008 | Fairchild | |
| 7,362,241 B2 | 4/2008 | Kubota et al. | |
| 8,314,686 B2 | 11/2012 | Kirtley, Jr. | |
| 8,395,526 B2 | 3/2013 | Kensy et al. | |
| 8,648,709 B2 | 2/2014 | Gauger et al. | |
| 9,617,134 B2 | 4/2017 | Swift | |
| 9,821,991 B2 | 11/2017 | Swift | |
| 2002/0175825 A1 | 11/2002 | Clerk et al. | |
| 2002/0190849 A1 | 12/2002 | Orzechowski | |
| 2003/0102974 A1 | 6/2003 | Allen | |
| 2003/0149513 A1* | 8/2003 | Muragishi ............... | G07C 3/00 701/1 |
| 2003/0213045 A1 | 11/2003 | Fuentes | |
| 2004/0036581 A1* | 2/2004 | Kawashima ............. | B60Q 1/34 340/425.5 |
| 2005/0270147 A1 | 12/2005 | Lewis | |
| 2008/0007400 A1 | 1/2008 | Murphy | |
| 2008/0018472 A1 | 1/2008 | Dasilva et al. | |
| 2009/0114485 A1* | 5/2009 | Eggert ................ | B66F 9/07545 187/394 |
| 2011/0118903 A1 | 5/2011 | Kraimer et al. | |
| 2011/0260888 A1 | 10/2011 | Fossier et al. | |
| 2011/0279261 A1 | 11/2011 | Gauger et al. | |
| 2013/0154815 A1 | 6/2013 | Min et al. | |
| 2013/0257607 A1 | 10/2013 | Rigby et al. | |
| 2014/0055252 A1 | 2/2014 | Ascencio | |
| 2014/0133944 A1* | 5/2014 | Pangrazio ............. | B66F 9/0755 414/667 |
| 2014/0278621 A1* | 9/2014 | Medwin ............. | G06Q 10/0631 705/7.12 |
| 2015/0175397 A1 | 6/2015 | Lynn et al. | |
| 2015/0254480 A1* | 9/2015 | Vanderpool ........ | G06K 7/10297 340/10.1 |

FOREIGN PATENT DOCUMENTS

| | | |
|---|---|---|
| CN | 1665696 A | 9/2005 |
| CN | 101135912 A | 3/2008 |
| CN | 203006881 | 6/2013 |
| DE | 1230325 B | 12/1966 |
| DE | 10320142 A1 | 2/2004 |
| DE | 102006002960 A1 | 7/2007 |
| DE | 202006020026 | 9/2007 |
| DE | 102006020026 | 10/2007 |
| DE | 102006050546 A1 | 4/2008 |
| DE | 102007050830 A1 | 4/2009 |
| DE | 102009030953 A1 | 12/2010 |
| EP | 0997344 A2 | 5/2000 |
| EP | 2700612 A1 | 2/2014 |
| GB | 1055727 | 1/1967 |
| JP | 6270752 | 9/1994 |
| WO | 2011029673 A1 | 3/2011 |

OTHER PUBLICATIONS

Garcia, Santiago; Office Action dated Aug. 9, 2016; U.S. Appl. No. 14/828,828; United States Patent and Trademark Office; Alexandria, VA.

Nwugo, Ojiako K.; Notice of Allowance; U.S. Appl. No. 15/446,329; dated Jul. 26, 2017; United States Patent and Trademark Office; Alexandria, VA.

Garcia, Santiago; Notice of Allowance; U.S. Appl. No. 14/828,828; dated Nov. 25, 2016; United States Patent and Trademark Office; Alexandria, VA.

First Office Action; Chinese Patent Application No. 201580043713.9; dated Jun. 21, 2018; State Intellectual Property Office of the People's Republic of China.

\* cited by examiner

DE-CENTRALIZED OPERATIONAL INDICATOR SYSTEM FOR A MATERIALS HANDLING VEHICLE

CROSS REFERENCE TO RELATED APPLICATIONS

This application is a continuation of U.S. patent application Ser. No. 15,446,329, filed Mar. 1, 2017, now allowed, which is a continuation of U.S. Pat. No. 9,617,134, filed Aug. 18, 2015, which claims the benefit of U.S. Provisional Patent Application Ser. No. 62/039,138, filed Aug. 19, 2014, entitled DE-CENTRALIZED OPERATIONAL INDICATOR SYSTEM FOR A MATERIALS HANDLING VEHICLE, the disclosures of which are hereby incorporated by reference.

BACKGROUND

The present disclosure relates in general to the communication of operational information via an indicator system of a materials handling vehicle, and in particular, to systems and methods for de-centralizing the conveyance of operational information about a materials handling vehicle.

Wireless strategies are being deployed by business operations, including distributors, retail stores, manufacturers, etc., to improve the efficiency and accuracy of business operations. In a typical wireless implementation, workers are linked to a management system executing on a corresponding computer enterprise via mobile wireless transceivers. For instance, in order to move items about a facility, workers often utilize materials handling vehicles, including for example, forklift trucks, hand and motor driven pallet trucks, etc. The wireless transceivers are used as interfaces to the management system to direct workers in their tasks, e.g., by instructing workers where and/or how to pick, pack, put away, move, stage, process or otherwise manipulate the items within a facility. As such, a facility such as a warehouse often has pedestrians, equipment operators, vehicle operators, etc., working in close proximity.

BRIEF SUMMARY

According to aspects of the present disclosure, a materials handling vehicle comprises an operator compartment, forks that can be raised and lowered to carry a load, a power unit, an outward facing output module, and a controller. The outward facing output module comprises an indicator directed away from an operators' compartment of the materials handling vehicle. In operation, the controller receives information from at least one of a remote server, and electronics of the materials handling vehicle, via a materials handling vehicle network bus, where the received information is in regard to a task being performed by the materials handling vehicle. Also, the controller, responsive to detecting the task being performed, operates the indicator of the outward facing output module to provide situational awareness information with regard to the task.

According to further aspects of the present disclosure, a method is provided of operating a materials handling vehicle. The method comprises providing a an outward facing output module having an indicator directed away from an operators' compartment of a materials handling vehicle. Here, the materials handling vehicle includes an operator compartment, forks that can be raised and lowered to carry a load, and a power unit. The method also comprises receiving information by a controller on the materials handling vehicle, wherein the information is received from at least one of a remote server, and electronics of the materials handling vehicle. The information is received via a materials handling vehicle network bus, where the received information is in regard to a task being performed by the materials handling vehicle. The method yet further comprises converting, by the controller, the received information into situational awareness information relevant to the task. Also, the method comprises detecting, by the controller, that the materials handling vehicle is involved in performing the task, and operating, responsive to detecting the task being performed, the indicator of the outward facing output module to provide situational awareness information with regard to the task.

DETAILED DESCRIPTION

Various aspects of the present disclosure provide a de-centralized operational indicator system for a materials handling vehicle. The de-centralized operational indicator system can be used to augment existing control displays (e.g., a dashboard) in a materials handling vehicle by placing an output device that communicates operational information in a position that is remote from the main control display/vehicle display console. As such, a dashboard mounted display can become secondary for certain types of information that will be conveyed by the de-centralized operational indicator system.

Moreover, the de-centralized operational indicator system can provide new types of operational information that cannot be displayed by the conventional display console of a materials handling vehicle. As such, the de-centralized operational indicator system not only augments, but also extends the existing displays provided in a materials handling vehicle. The de-centralized operational indicator is also designed to enhance situational awareness for both the operator of the materials handling vehicle, and for targets such as pedestrians, equipment operators, equipment, vehicles, etc., that are proximate to the materials handling vehicle, by communicating information to both the vehicle operator, and to targets external to the materials handling vehicle.

Figure 1:
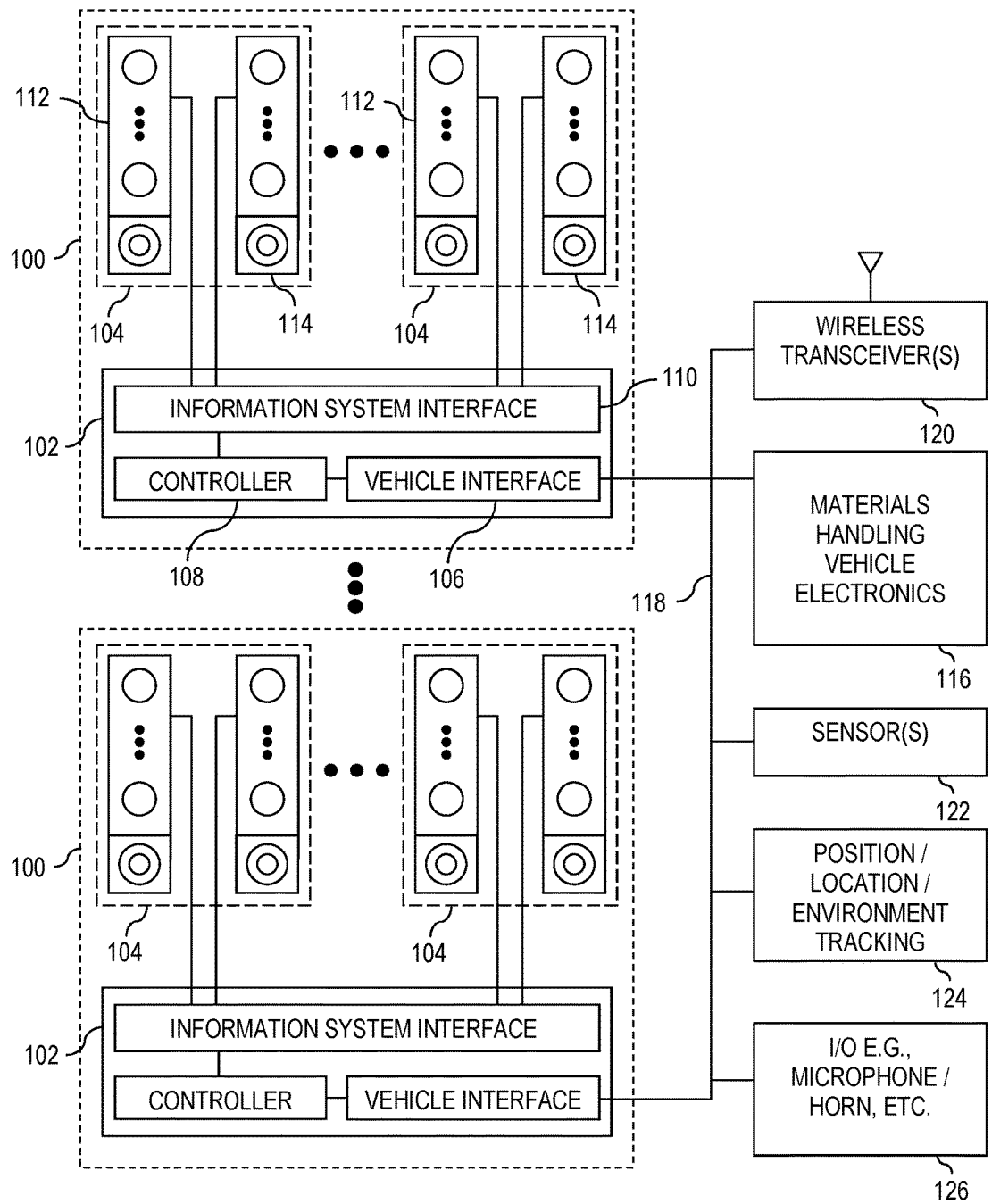
FIG. 1 is a block diagram of a de-centralized operational indicator system for a materials handling vehicle, according to various aspects of the present disclosure.

Referring now to the drawings and in particular to FIG. 1, a decentralized operational indicator system includes at least one operational indicator component 100. Each operational indicator component 100 includes a communication module 102 and at least one output module 104. The communication module 102 includes a vehicle interface 106, a controller 108, and an information system interface 110. Each output module 104 includes an output such as at least one illumination device 112. Each output module 104 may also include one or more additional devices 114, such as a speaker, haptic device, transmitter, or other information output capable apparatus.

Communications Module:

Turning now with specific reference to the communication module 102, the vehicle interface 106 is configured to communicate with at least one remote device. For instance, as illustrated, the vehicle interface 106 communicates with electronics 116 of a materials handling vehicle to which the operational indicator component 100 is attached. In this regard, the vehicle interface 106 may include buffers, amplifiers, conversion logic, communications circuits, and other circuitry to handle any conversions, transformations or other manipulations necessary to interface the controller 108 with the electronics 116 of the materials handling vehicle.

For example, the vehicle interface 106 may comprise a vehicle bus interface, e.g., a Controller Area Network (CAN) bus interface, which electronically connects to a native vehicle network bus 118 (e.g., a CAN bus) to communicate with electronics 116 of the materials handling vehicle across the vehicle network bus 118. As will be described in greater detail herein, in this manner, information, e.g., about the operating state of the materials handling vehicle can be communicated to the vehicle interface 106, and hence to the controller 108, directly across the vehicle network bus 118.

In illustrative implementations, the vehicle interface 106 is electrically coupled to a transceiver 120 to receive information from a remote server computer via a wireless connection. For instance, the vehicle interface 106 may communicate with a wireless communication device, which may be integrated into the communication module 102 or provided on the materials handling vehicle. With specific reference to FIG. 1, the vehicle interface 106 utilizes (e.g., via the vehicle network bus 118), a transceiver 120 to communicate with a remote server across a wireless infrastructure. The vehicle interface 106 may also interact with one or more remote wireless devices via the wireless communication device, such as another materials handling vehicle, an individual wearing a communications-equipped vest, a machine or appliance in the work environment, etc.

The controller 108 receives the information obtained by the vehicle interface 106 and converts the received information to situational information regarding at least one of the materials handling vehicle and the environment in which the vehicle is operating. More particularly, controller 108 implements various logic algorithms and processing necessary to transform the information received by the vehicle interface 106 into commands to control the output module(s) 104, which communicate with the communication module 102 through the information system interface 110. As will be described in greater detail herein, the controller 108 controls the output module(s) 104 to provide de-centralized operational information to the operator of the materials handling vehicle. The controller 108 also controls the output module(s) 104 to provide information to external target(s), such as pedestrians, other equipment operators, workers, and others proximate to the materials handling vehicle, equipment, devices and other technologies that can sense, detect, read, scan or otherwise identify an output of the output module 104.

The controller 108 includes a processor, any necessary memory (including program space, storage space, or both), and other necessary hardware to couple to the vehicle interface 106 and information system interface 110. The controller 108 can use the processor to implement a rules engine, a state machine, or other structure to control the output module(s) 104. Moreover, the controller can apply algorithms, computations, formulas, simulations and other processing techniques to determine when to issue a command to an output module 104. As an illustrative example, the controller 108 may be aware of the definitions of variables stored in a data object model of the corresponding materials handling vehicle. This data object model may be available either directly or indirectly over the vehicle network bus 118. Thus, the controller 108 can access the vehicle network bus 118 of the materials handling vehicle to extract data to populate the rules, to check for states or state transitions, to derive variables for formulas, etc. The controller 108 may also receive commands from the materials handling vehicle or from a remote server to initiate certain outputs, e.g., to address driving in a dark portion of a warehouse, to respond to an impact, etc. The controller 108 can also utilize wireless communications to receive updates or changes to the rules, etc., to remain current with the needs of the application.

The information system interface 110 converts the output of the controller 108 into control signals suitable to interface with the output module(s) 104. In this regard, the information system interface 110 may include buffers, amplifiers, conversion logic, etc., to handle conversions, transformations or other manipulations necessary to interface the controller 108 with the output module(s) 104.

The controller 108 maps, computes, transforms, processes or otherwise generates information based upon signals received at the vehicle interface 106, to control one or more output modules 104. The controller 108 may also map, compute, transform, process, or otherwise generate information based upon signals from a microphone, speaker, transmitter, etc., from one or more of the device(s) 114. Here, the signals processed by the controller 108 are received by the information system interface 110, which are communicated through the vehicle interface 106 to the materials handling vehicle (thus supporting bi-directional communication, i.e., I/O).

The vehicle interface 106 may be discrete and independent from the controller 108. Alternatively, the vehicle interface 106 may be implemented using logical components that are integrated into the controller 108, e.g., through the use of a microcontroller or other suitable processor that includes built-in control technology. Likewise, the information system interface 110 may be discrete and independent from the controller 108. Alternatively, the information system interface 110 may be logical components that are integrated into the controller 108, e.g., through the use of a microcontroller or other suitable processor that includes built-in control technology.

Output Modules:

Each output module 104 interfaces with a corresponding communication module 102. In this regard, there is at least one output module 104 connected to a corresponding communication module 102. However, in alternative implementations, there may be multiple output modules 104 coupled to a single communication module 102. For instance, as will be described in greater detail herein, a materials handling vehicle may include a set (e.g., three to four) of the operational indicator components 100 surrounding an operator of the materials handling vehicle. In this example, there may be as few as one output module 104 per communication module 102. As another example, a materials handling vehicle may include a single communication module 102 that controls a set (e.g., three to four) output modules 104 that are arrayed around the operator of the materials handling vehicle.

Moreover, each output module 104 may comprise a single output device, e.g., a single illumination device, multiple illumination devices that make up a single output device, etc. Each output module 104 may alternatively comprise multiple output devices. For instance, as will be described in greater detail herein, at least one output module 104 includes a first output device implemented as a first illumination device that is inward facing, and a second output device implemented as a second illumination device that is outward facing.

By "inward facing", it is meant that when installed on the materials handling vehicle, the first output device is oriented in a first direction that is detectable by an operator of the materials handling vehicle when the operator is within an operating compartment of the materials handling vehicle. For instance, where the first output device is a first illumination device, the first illumination device may be oriented in the first direction so as to direct light within the operating compartment of the materials handling vehicle. As a few illustrative examples, the first direction is generally facing an operator's station, such as an operator's seat for a sitdown rider, an operator's platform for a standup rider, or sit/stand operator area such as for a turret stock picker, etc. The first output device may alternatively be oriented in a first direction that is directed towards a current vehicle operator position, or other operator orientation provided within the materials handling vehicle.

By "outward facing", it is meant that when installed on the materials handling vehicle, the second output device is oriented generally facing away from the materials handling vehicle. For instance, where the second output device is a second illumination device, the second illumination device is oriented in the second direction so as to direct light outside of, and away from the materials handling vehicle.

The outward facing illumination device provides situational awareness information from the materials handling vehicle to a target that is external to the materials handling vehicle. Examples of a target external to the materials handling vehicle include a co-worker in the vicinity of the materials handling vehicle, the vehicle operator that has stepped out of the operator's compartment and off the materials handling vehicle (e.g., to perform a pick operation), a pedestrian in the vicinity of the materials handling vehicle, equipment or warehouse features (such as racks, machinery, etc.) near the materials handling vehicle, etc.

According to yet another example, the inward facing output devices and the outward facing output devices may be determined by conceptually constructing an imaginary circle around the vehicle. A tangent along the circle is selected. In this regard, output devices such as lights directed inward of the tangent are designated as inward facing output devices for the operator. Likewise, output devices such as lights directed outward of the tangent are designated as outward facing lights for targets external to the materials handling vehicle.

Moreover, an output device need not be physically connected or otherwise physically wired to the materials handling vehicle. Rather, the output device may be integrated into a worker vest, glove or other wearable device. In this regard, the output device receives wireless information from the controller 108. Here, the communication module 102 may include a transceiver that the controller 108 can access. As another example, the controller 108 may be able to access one or more of the wireless transceiver(s) 120 on the materials handling vehicle. Thus, an outward facing output device can be an illumination device on the materials handling vehicle that directs light outward and away from the materials handling vehicle, an illumination device or other output device on a vest worn by the vehicle operator or other workers in the vicinity of the materials handling vehicle, etc.

Likewise, it is possible to implement the same functionality using a first output module 104 that is configured to be inward facing and a second output module 104 that is configured to be outward facing.

Each illumination device may be a Light Emitting Diode (LED). As another example, multiple LEDs or other suitable light emitting technology can be combined to form a single illumination device (e.g., multiple LEDs combined into a single light). In other example implementations, there are multiple independent illumination devices, e.g., multiple LED displays. This allows different lights to be dedicated to different types of information. In this example, the individual illumination displays may be stacked, e.g., as a light pole, which is oriented horizontal, vertical, or in other patterns. Alternatively, a single, color changing light (e.g., comprising one or more color changeable LEDs or different colored LEDs) can be utilized to convey different information by controlling the light to emit different colors at the appropriate times.

As such, the first output device may comprise a plurality of lights. In this regard, the controller 108 is programmed to selectively control each of the plurality of lights such that each light, when illuminated, conveys different information intended for the operator of the materials handling vehicle. Likewise, the second output device may comprise a plurality of lights. In this regard, the controller 108 is programmed to selectively control each of the plurality of lights such that each light, when illuminated, conveys different information intended for a person remote from, but proximate to the materials handling vehicle.

Still further, the illumination device may comprise a matrix of LEDs, an LED array, one or more LCD displays, a display screen, or any combination of the above. Moreover, other illumination technologies may be utilized. For instance, one or more output device can include a projector, filter, or other suitable device that casts an image onto the floor or other surface. The image may comprise a directional arrow, a message to pedestrians or equipment operators in proximity to the materials handling vehicle, etc. Also, the information may be directed to the operator of the materials handling vehicle, e.g., to designate a next location to travel to, to indicate to the operator when the operator has reached the next designation, an instruction, e.g., about an approaching intersection or section of a warehouse, etc.

As still further examples, an illumination device may comprise a light "ring", e.g., an array of lights that surround or partially surround a portion of the materials handling vehicle in a manner that the lights can be controlled to simulate or impart a sense of motion of the lights, e.g., using techniques such as flashing the lights in an ordered sequence, controlling light color, controlling light intensity or combinations thereof, to convey direction, speed, etc.

As will be described in greater detail herein, at least one output module 104 is coupled to the information system interface 110 of a corresponding communication module

102, having a first output device and a second output device. The system is configured such that when installed on the materials handling vehicle, the first output device is oriented in a first direction that is detectable by an operator of the materials handling vehicle when the operator is within an operating compartment of the materials handling vehicle (e.g., generally facing an operator's position within the materials handling vehicle). The second output device is oriented in a second direction that is detectable outside of the materials handling vehicle. In this configuration, information is received by the vehicle interface 106 of the communication module 102 from materials handling vehicle electronics 116. The vehicle interface passes information to the controller 108, which includes programming configured to analyze the received information, generate a first control signal for controlling the first output device, and generate a second control signal for controlling the second output device (e.g., via the information system interface).

In a more specific implementation, the first output device comprises a first illumination device and the second output device comprises a second illumination device. Under this configuration, the first illumination device is installed on the materials handling vehicle remote from the main control display, and is oriented in the first direction (the inward facing direction) so as to direct light within the operating compartment, and is thus visible to the operator of the materials handling vehicle when the operator is within the operating compartment of the materials handling vehicle. On the other hand, the second illumination device is installed on the materials handling vehicle remote from the main control display, and is oriented in the second direction (the outward facing direction) so as to direct light that is visible outside of the materials handling vehicle.

Accordingly, operational information can be communicated to the operator of the materials handling vehicle via the first illumination device in a manner that is de-centralized (remote) from a control console/display of the materials handling vehicle. Moreover, the ability to control an illumination device simplifies the information that is conveyed, resulting in glanceable information that can bring about or otherwise enhance situational awareness of the operating environment. Moreover, information can be derived without requiring the vehicle operator to change focus from the work at hand.

Likewise, operational information can be communicated to targets external to the materials handling vehicle. As noted in greater detail herein, targets may comprise persons or equipment (e.g., with sensing capability), which are proximate to the materials handling vehicle. For instance, persons may be notified of operational information via the second illumination device. Likewise, an output module 104 may broadcast, transmit, or otherwise communicate information, e.g., via propagating signals, illumination, etc., to target devices where applicable. This can bring about situational awareness with regard to the operation of the materials handling vehicle.

Thus, the controller 108 can use the same information (e.g., from the electronics 116 of a materials handling vehicle) to derive a single message that is communicated to the first output device, the second output device, or both. As another example, the controller 108 can utilize the same information to derive two distinct/different messages (e.g., convey different yet related or non-related information), e.g., a first message for the first illumination device, and a second message for the second illumination device. As yet another example, the controller 108 can utilize different information to generate the same message for both the first display device and the second display device. Yet further, the controller 108 can utilize different information to generate different messages for both the first display device and the second display device.

By way of example and not by way of limitation, upon approaching an intersection, the controller 108 receives an indication from the materials handling vehicle electronics 116 that there is a pedestrian in the vicinity. For instance, in an illustrative embodiment, the materials handling vehicle electronics 116 include an RFID reader, or other form of radio frequency (RF) receiver that can read a signal transmitted by a tag (e.g., RFID chip, RF transmitter, etc.) on the pedestrian. As such, the first illumination device may illuminate a red warning light to indicate the presence of the pedestrian. Where there are output modules 104 that surround the operator of the materials handling vehicle, a select light or group of illumination devices may be illuminated to provide direction information as to the direction of the pedestrian relative to the materials handling vehicle, to provide further situational awareness to the vehicle operator.

Additional dimensions of information may also be provided, e.g., using blink rate, color, intensity, etc., to indicate a general distance of the pedestrian from the materials handling vehicle. As another example, the operator may be approaching a mandatory stop, e.g., at an aisle end, etc. An illumination device is utilized to remind the operator to stop at the appropriate location. Here, environmental based location tracking that is tied into the materials handling vehicle electronics 116 can identify the location of the materials handling vehicle, and the location of the oncoming stop location. The controller 108 can use this information with native materials handling vehicle information, such as speed, direction of travel, etc., to determine when to apply the warning via the illumination device.

Moreover, the second illumination device (or devices oriented away from the materials handling vehicle) can convey the same information in the examples above, or the illumination device(s) facing away from the materials handling vehicle can convey different information. For example, the second illumination device may illuminate a white light directed towards the pedestrian. The white light directs the pedestrian's attention to the oncoming materials handling vehicle. As another example, the second illumination device may convey glanceable information pertaining to the speed of the materials handling vehicle, the direction of travel, a skill level of the operator of the materials handling vehicle, an identity of the vehicle, an identity of the operator, an identity of the content of a load on the forks of the materials handling vehicle, etc.

Materials Handling Vehicle/Operational Indicator Component Interface:

In illustrative implementations, the vehicle interface 106 communicates directly with materials handling vehicle electronics 116 across the vehicle network bus 118. The vehicle network bus 118 is any wired or wireless network, bus or other communications capability that allows electronic components of a materials handling vehicle to communicate with each other. In this regard, the vehicle network bus is local to the materials handling vehicle. As an example, the vehicle network bus may comprise one or more of a controller area network (CAN) bus, ZigBee, Bluetooth, Local Interconnect Network (LIN), time-triggered data-bus protocol (TTP), Ethernet, or other suitable communication strategy (including combinations thereof).

As will be described more fully herein, utilization of the vehicle network bus 118 enables integration of the operational indicator component 100 into the native electronics 116 including controllers of the materials handling vehicle, and optionally, any electronics peripherals associated with the materials handling vehicle that integrate with and can communicate over the vehicle network bus. However, the vehicle interface 106 may alternatively communicate with the corresponding materials handling vehicle through other wired or wireless connections. In this manner, the materials handling vehicle electronics may couple to a mobile asset information linking device (see information linking device 38) as set out in U.S. Pat. No. 8,060,400, the disclosure of which is incorporated by reference in its entirety.

In illustrative implementations, the vehicle interface 106 also communicates directly or indirectly with one or more sensors 122 attached to the corresponding materials handling vehicle. Example sensors 122 include proximity sensors such as ultrasonic sensors, laser scanners, capacitive sensors, etc. A sensor 122 can also include a radio frequency identification (RFID) reader that can read RFID tags, e.g., embedded in the floor, in racks, on persons, on products, on work implements and other machines, etc. Example sensors 122 also include acceleration sensors, presence sensors, timers, proximity sensors and other sensor technologies.

In exemplary implementations, the vehicle interface 106 further communicates directly or indirectly with a position/ location/environmental tracking device 124 that provides position information of the corresponding materials handling vehicle, targets in the environment of the materials handling vehicle or both. Environmental tracking may be localized, e.g., relative to the materials handling vehicle, or fixed global positioning, e.g., relative to a warehouse or other location of operation.

Thus, in an illustrative example, the vehicle interface 106 electronically connects to at least one sensor that is connected to the materials handling vehicle, which senses at least one of vehicle location (e.g., environmental based location tracking) and targets proximate to the materials handling vehicle (e.g., using proximity sensors such as an RF transmitter/receiver pair, RFID, capacitive sensor, ultrasonic sensor, etc.).

The vehicle interface 106 may still further communicate directly or indirectly with other input/output devices 126, including for instance, a microphone, horn, audible tone, etc.

Accordingly, an embodiment can include the vehicle interface 106 in data communication with any combination of materials handling vehicle electronics 116, a wireless transceiver 120, sensors 122, environmental tracking 124, and I/O 126.

Remote Information Gathering:

In illustrative implementations, the operational indicator component 100 is coupled to a transceiver 120 for wireless communication across a network infrastructure, e.g., based upon a wireless protocol, such as an 802.11. The ability to interact with a server facilitates the ability to analyze information external to the materials handling vehicle to make decisions as to how to operate the output module(s) 104, examples of which are described in greater detail herein.

Figure 2:
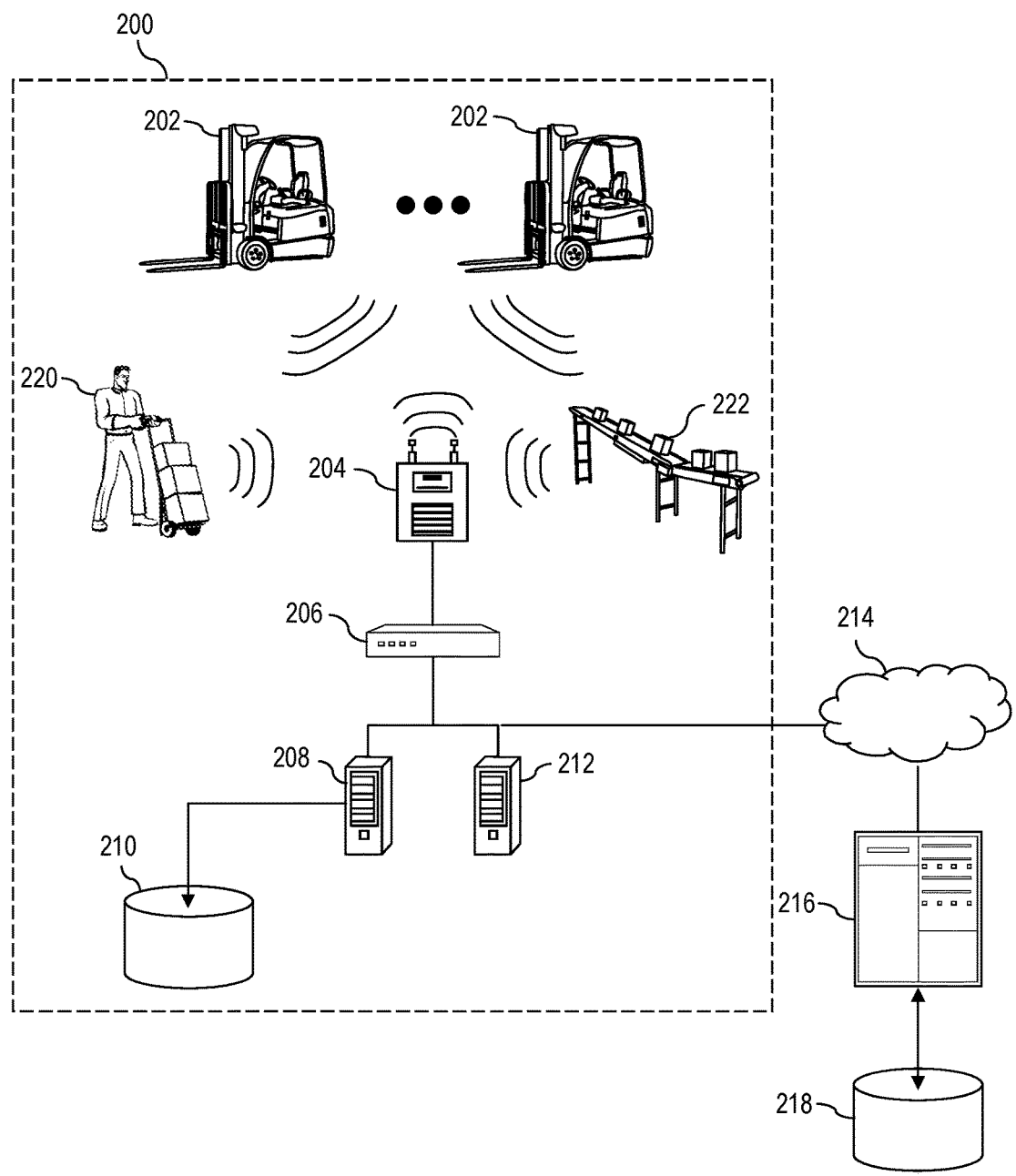
FIG. 2 is a schematic representation of a fleet of materials handling vehicles operating in a wireless environment, according to aspects of the present disclosure.

Referring to FIG. 2, an operational working environment 200 is schematically illustrated. The operational working environment includes a plurality of materials handling vehicles 202, implemented as forklift trucks (solely for purposes of illustration) that wirelessly communicate, e.g., via a transceiver 120 (see FIG. 1) to an access point 204. In this example, each materials handling vehicle 202 has installed thereon, one or more operational indicator components 100 as described with reference to FIG. 1.

The access point 204 conveys the wirelessly communicated information through one or more intermediate devices 206, e.g., routers, hubs, firewalls, network interfaces, wired or wireless communications links and corresponding interconnections, cellular stations and corresponding cellular conversion technologies, e.g., to convert between cellular and tcp/ip, etc., to a materials handling vehicle application server 208. The materials handling vehicle application server 208 stores operational information in a database 210 and may communicate with other business servers 212 in a facility. The materials handling vehicle application server 208 may also communicate across the Internet 214 to a remote server 216, e.g., a server managed by the materials handling vehicle manufacturer, which may store data collected by the manufacturer and one or more facilities in a database 218. Thus, the transceiver 120 of FIG. 1 may be utilized as a bridge to exchange information between the controller 108 of the operational indicator component 100 and any of the materials handling vehicles 202, the materials handling vehicle application server 208, the business server 212, the remote server 216, or other device.

As schematically illustrated in FIG. 2, a materials handling vehicle 202 typically operates in a warehouse or other environment in which the vehicle must maneuver in the presence of targets such as workers/pedestrians 220, stationary machines and equipment 222, other materials handling vehicles 202, as well as storage locations, and other objects in the operating environment. As such, according to aspects of the present disclosure, the operational indicator system 100 installed on each materials handling vehicle 202 provides information to both the vehicle operator and others working in the environment to raise situational awareness. In certain illustrative implementations, the workers 220, equipment 222, etc., communicate with the materials handling vehicle application server 208, which in turn, communicates relevant target location information to the materials handling vehicles 202. Alternatively the workers 220, equipment 222, etc., can be tagged, such as using RFID tags, transmitters, beacons or other suitable position determining, or environmental based location tracking devices so as to be sensed directly or indirectly by a materials handling vehicle 202 locally.

Figure 3:
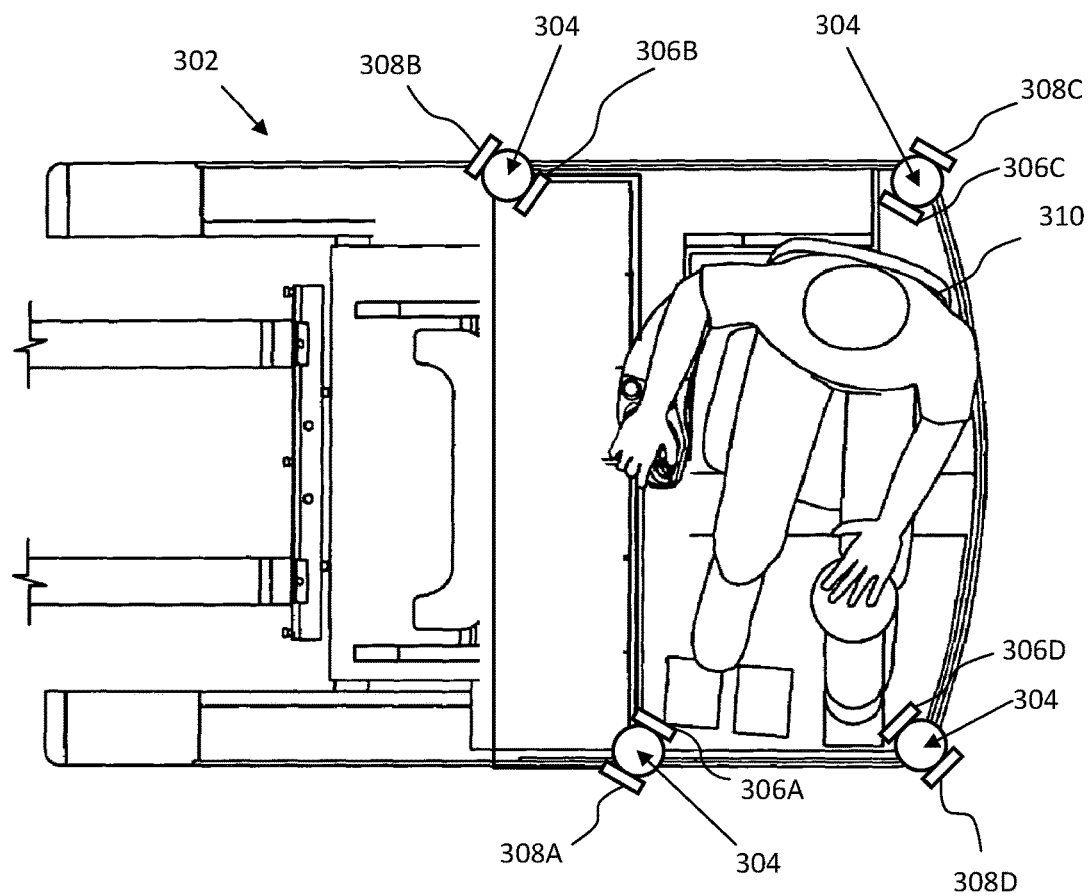
FIG. 3 is a schematic diagram of a de-centralized operational indicator system installed on a side sit reach truck, according to various aspects of the present disclosure.

Example Operational Indicator System:

Referring to FIG. 3, a materials handling vehicle 302 includes the operational indicator system as described in FIG. 1; and the wireless communication features of the materials handling vehicle 202. The materials handling vehicle 302 is implemented as a "side-sit" forklift. In this exemplary implementation, there are four output devices 304, The output devices 304 may be implemented as individual instances of the operational indicator component 100 (e.g., four distinct instances), a communication module 102 coupled to multiple output modules 104, etc., as described more thoroughly with reference to FIG. 1. In this example, each output device 304 includes an inward facing output 306A, 306B, 306C, and 306D. Each output device 304 also includes an outward facing output 308A, 308B, 308C, and 308D. FIG. 3 illustrates the inward facing output 306A, 306B, 306C, and 306D and the corresponding outward facing output 308A, 308B, 308C, and 308D in the same housing. However, such need not be the case.

In this example, the inward facing outputs face an operator's compartment, and more particularly, the operator's seat 310 in this example. Because the inward facing output 306A, 306B, 306C, and 306D surround the operator, the controller 108 (or controllers 108) control or are otherwise orchestrated to provide glanceable operational information, such as direction information, e.g., regardless of the direction of gaze of the vehicle operator. Moreover, intensity, color, or other controllable attributes can be utilized to convey other glanceable, yet actionable information. Still further, the inward facing output 306A, 306B, 306C, and 306D can generate sound, e.g., via speakers to provide direction information to the operator. As such, the inward facing output 306A, 306B, 306C, and 306D can be utilized to warn of quickly approaching vehicles that may otherwise be in the blind spot of the operator, to indicate the location of pedestrians or other targets in the vicinity of the materials handling vehicle, to indicate speed, etc.

Because each operational indicator component 100 is tied to the vehicle electronics, e.g., via the CAN bus, via Bluetooth, etc., complex information can be organized into simple, concise outputs. For instance, speed as a function of load on forks can be conveyed with the inward facing output 306A, 306B, 306C, and 306D. Likewise, speed as a function of obstacles, warehouse location, or any number of other factors that can be integrated into a glanceable message can be conveyed with the inward facing output 306A, 306B, 306C, and 306D.

As another example, if the operator drives through a turn at an excessive rate of speed, the inward facing outputs 306A, 306B, 306C, and 306D can convey a proper warning. For instance, where at least one output, e.g., 306A is an illumination panel, a warning message may be displayed, such as to "slow down". Alternatively, a visual metaphor may be provided, such as a directional arrow that points up or down informing the vehicle operator how to alter vehicle speed as the materials handling vehicle approaches an intersection. Alternatively, where the inward facing outputs 306A, 306B, 306C, and 306D comprise lights, a selected color may be used to inform the operator that the vehicle speed is excessive. Still further, a light may provide an affirmation that the operator is performing a job properly. In this regard, the affirmation is implemented without requiring the operator to shift focus from the task at hand.

Moreover, one or more lights may flash, change in intensity, change in color, generate a pattern, etc. that conveys information. For instance, the difference in permitted speed in the turn and the actual speed in the turn may be computed. Based upon the difference, the intensity of a light may be modulated, so that as the driver slows down or speeds up, the modulation changes accordingly to inform the operator.

Still further, if the materials handling vehicle is equipped with environmental based location tracking, the vehicle will know that a turn is ahead before the vehicle reaches the turn. In this case, at least one inward facing output, e.g., 306A can begin to modulate, e.g., pulse, flash, glow, as the vehicle approaches the intersection, thus coaching the vehicle operator in proper vehicle operation in a manner that is glanceable.

In another example, the inward facing outputs 306A, 306B, 306C, and 306D can inform the vehicle operator of the general location of a pedestrian. For instance, inward facing light 306D is illustrated as being behind and to the right of the materials handling vehicle. Thus, a pedestrian behind and to the right of the materials handling vehicle may be out of site of the vehicle operator. However, in an example configuration, the operational indicator system alerts the operator, e.g., by sounding a horn or issuing a command to a haptic device located proximate to the inward facing light 306D. Thus, even if the vehicle operator cannot see the inward facing light 306D in certain operating positions, the vehicle operator is alerted to the existence of a pedestrian behind and to the right of the materials handling vehicle (in this example).

Notably, because the inward facing outputs 306A, 306B, 306C, and 306D are arrayed around the operator, a light from at least one of the inward facing outputs 306A, 306B, 306C, and 306D will be visible to the vehicle operator regardless of operating position.

The outward facing output 308A, 308B, 308C, and 308D outputs are utilized to convey information to targets outside the materials handling vehicle 302. Because the materials handling vehicle 302 communicates with a server via one or more wireless connections, the conveyed information may relate to the operation of the materials handling vehicle 302, the vehicle operator, the task to be performed, or the environment in which the materials handling vehicle 302 is operating. For instance, the outward facing output 308A, 308B, 308C, and 308D can convey information about the speed of the vehicle, direction of travel of the vehicle, the intent of the vehicle to stop, accelerate, change directions, raise or lower forks, etc. The outward facing output 308A, 308B, 308C, and 308D can also convey information extracted from a server or otherwise obtained by the materials handling vehicle, e.g., the identity of the operator, the identity of the vehicle itself, the skill level of the operator, a shift, a team associated with the vehicle, etc. Still further, the wireless connection allows integration to a business server to obtain operational information, e.g., from a warehouse management system. This allows the controller 108 to communicate information via the outward facing output 308A, 308B, 308C, and 308D, about the assigned task or activity that the vehicle is engaged in.

In general, the controller 108 (FIG. 1) can receive messages from the vehicle network bus of the materials handling vehicle 302. By using control maps pre-loaded into the controller 108 and by causing the controller 108 to execute a rules processing engine, the controller 108 can generate the necessary output signals to the output module(s) 104 to convey any number of advanced glanceable functions. The controller 108 may also detect changes in the state of vehicle information, e.g., by comparing previously stored state values against current state values. For instance, if a materials handling vehicle only stores or otherwise senses the current speed, then the controller may use memory to store one or more previous values to determine whether the vehicle is accelerating, decelerating, maintaining a constant speed, is stopped, etc. Moreover, the controller can use states or state change information to determine when to turn outputs (e.g., lights) on, off, when to change color, when to change intensity, etc.

Still further, the controller 108 may receive commands, e.g., from the materials handling vehicle 302 via a remote server, to turn on a specific output or to turn off a specific output. For instance, a remote server may instruct the controller 108 to turn on or start flashing, a series of lights in response to detecting an impact, upon detecting that the operator picked up the wrong pallet, to inform an operator that a shift is over, to inform an operator that it is time for a scheduled battery change or planned maintenance, etc.

Figure 4:
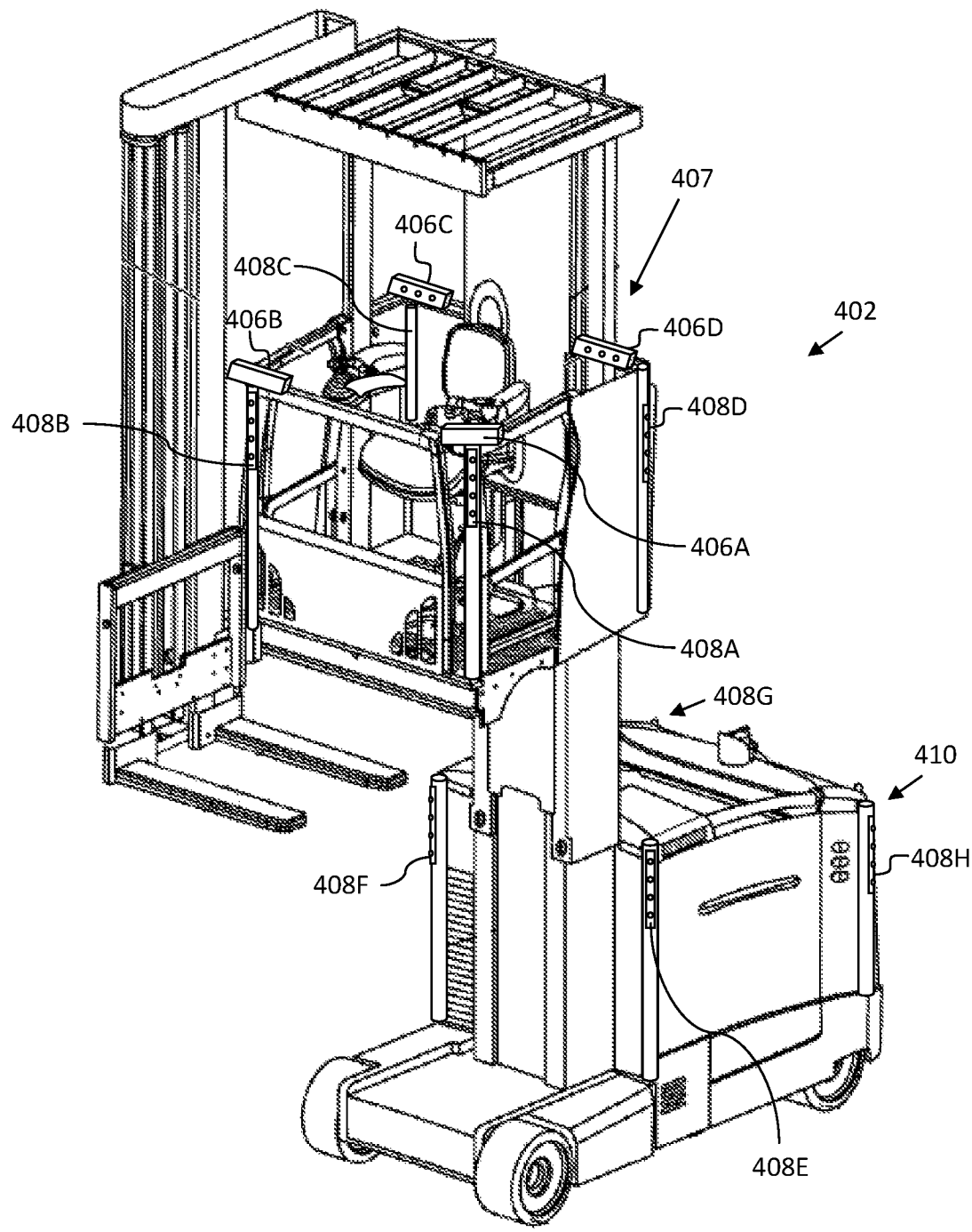
FIG. 4 is a schematic diagram of a de-centralized operational indicator system installed on a turret stock picker truck, according to various aspects of the present disclosure.

Referring to FIG. 4, a materials handling vehicle 402 includes the operational indicator system as described in FIG. 1, and the wireless communication features of the materials handling vehicles 202. The materials handling vehicle 402 comprises a turret stock picker. In this implementation, the vehicle operator raises and lowers with the forks. As such, the illumination devices are provided in a more distributed manner. More specifically, the system includes an inward facing output 406A, 406B, 406C, and 406D that surround an operator's compartment 407. In this illustrative example, each inward facing output 406A, 406B, 406C, and 406D is illustrated as a light bar having a plurality of illumination devices, each illumination device separately controllable to convey different information.

In the materials handling vehicle 402, the operator's seat can pivot, swivel or otherwise rotate. Moreover, the operator may stand up and even move about the operator's compartment 407. However, regardless of the operator activity, e.g., sitting, standing, etc., at least one of the inward facing outputs 406A, 406B, 406C, and 406D that surround the operator's compartment 407 will be directed towards the operator.

In certain implementations, the rotational position of the seat is tracked by the materials handling vehicle electronics 116. Moreover, the position of the operator in the operator's compartment 407 is tracked by the materials handling vehicle electronics 116. That is, the electronics 116 on the materials handling vehicle 402 knows if the vehicle operator is standing, sitting, side facing, forward facing, etc. As such, this information may be utilized to generate intelligent decisions as to which one or more of the inward facing outputs 406A, 406B, 406C, and 406D is activated to capture the attention of the vehicle operator. Moreover, the operator orientation may be tracked so that dynamic behaviors such as changing operator orientation can be accounted for when directing information to the vehicle operator.

The system also includes outward facing outputs 408A, 408B, 408C, and 408D that surround the operator's compartment 407. The system also includes outward facing outputs 408E, 408F, 408G, and 408H that surround a power unit 410 of the materials handling vehicle 402. In this regard, the outward facing outputs 408A, 408B, 408C, 408D, 408E, 408F, 408G, and 408H are implemented as light bars that extend generally vertical along the corners of the operator's compartment and power unit of the materials handling vehicle 402. This allows information to be conveyed external to the materials handling vehicle 402 regardless of whether the operator's compartment 407 is raised or lowered.

Thus, FIG. 4 illustrates that output devices may be oriented in different directions, different heights and different parts of a materials handling vehicle. In this regard, the precise placement of the output devices will depend upon the situational awareness information to be conveyed.

Otherwise, the system of FIG. 4 can implement any of the functions described more fully herein.

Figure 5:
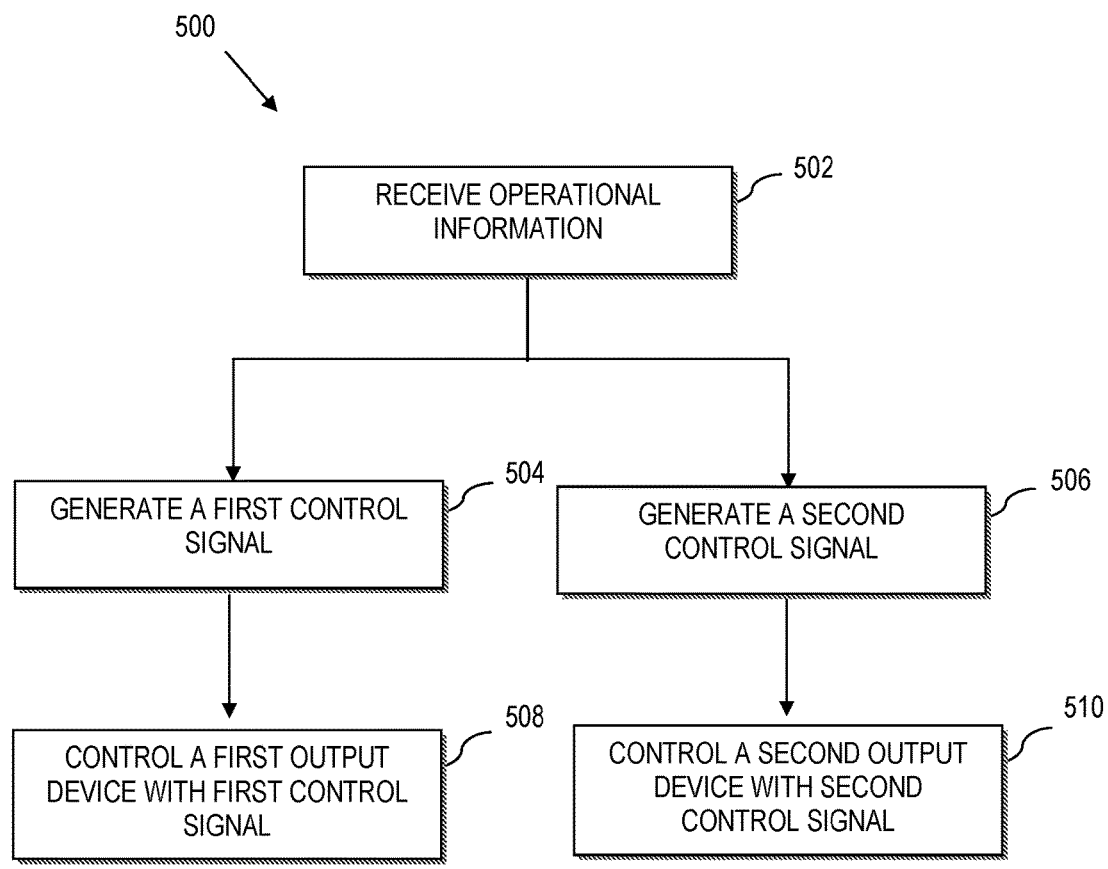
FIG. 5 is a flow chart that describes an algorithm for implementing a de-centralized operational indicator system according to aspects of the present disclosure.

Decentralized Indicator System Algorithm:

Referring to FIG. 5, a flowchart illustrates an algorithm for implementing a decentralized information display on a materials handling vehicle, according to aspects of the present disclosure. In this regard, the algorithm implements a method 500 of providing situational awareness. The method comprises receiving, at 502, operational information about a work environment from a materials handling vehicle. As described in greater detail herein, this information is received by the controller 108 of the operational indicator system, and can include information about vehicle location, the location of targets in the vicinity of the materials handling vehicle, the state or status of the materials handling vehicle, or combinations thereof.

The method 500 also comprises generating, at 504, a first control signal representing a first situational awareness message for an operator of the materials handling vehicle based at least in part, upon the received operational information. The first situational awareness message is embodied as control signals that control one or more output devices, e.g., lights, sounds, haptic devices, etc., that are directed in the "inward facing direction" as described more fully herein.

The method 500 still further comprises generating, at 506, a second control signal indicative of a second situational awareness message for a target external to the materials handling vehicle based at least in part, upon the received operational information, where the second situational awareness message is different from the first situational awareness message. The second situational awareness message is embodied as control signals that control one or more output devices, e.g., lights, sounds, etc., that are directed in the "outward facing direction" as described more fully herein.

The method 500 also comprises controlling, at 508, a first output device mounted on the materials handling vehicle using the first control signal, to output the first situational awareness message. The method 500 also comprises controlling, at 510, a second output device mounted on the materials handling vehicle using the second control signal, to output the second situational awareness message.

In an illustrative implementation of the method 500, receiving, at 502, operational information comprises receiving at least one piece of operational information from a remote server, by a transceiver on the materials handling vehicle. The operational information may relate to the location of a target that is proximate to, but external to the materials handling vehicle. By way of example, receiving at least one piece of operational information from a remote server may comprise receiving the location of a pedestrian in the vicinity of the materials handling vehicle. Moreover, receiving at least one piece of operational information from a remote server may comprise receiving the location of a piece of equipment, such as receiving information about another vehicle operating in the vicinity of the materials handling vehicle.

In further illustrative examples, receiving at least one piece of operational information from a remote server may comprise receiving an indication that the materials handling vehicle is approaching an area that requires a change in operation of the materials handling vehicle. For instance, receiving at least one piece of operational information may comprise receiving information that the materials handling vehicle is approaching an end of an aisle where a select one of a slow down and a stop are required.

In still a further exemplary implementation, receiving operational information can comprise receiving at least one piece of operational information directly from a target that is proximate to, but external to the materials handling vehicle. For instance, the method may comprise communicating wirelessly with at least one remote garment (e.g., a vest) equipped with a transceiver, to obtain situational information that is utilized to determine whether to generate at least one of the first control signal and the second control signal. As another example, the method may comprise receiving at least one piece of operational information by electronics of the materials handling vehicle, which relates to the location of a target that is proximate to, but external to the materials handling vehicle, and receiving at least one previously determined (e.g., previously recorded) operational characteristic of the materials handling vehicle. For instance, a particular operator may have an assessed skill level of "2". Moreover, a warehouse manager may determine that skill level 2 operators must not exceed 3 miles per hour when in the vicinity of a certain type of worker, e.g., a stock picker.

In yet a further example implementation, the method further comprises receiving operational information, generating the first indicator control signal to generate a first output pattern using the received operational information, and generating the second indicator control signal to generate a second output pattern different from the first output pattern using the received operational information. For example, a speed sensor on a materials handling vehicle may indicate that the vehicle is slowing down. This may trigger the first indicator control signal to generate a first output pattern, e.g., a green light as the inward facing output. However, this may also trigger the second indicator control signal to generate a second output pattern different from the first output pattern. For instance, the second indicator control signal may cause the outward facing light to flash red informing a pedestrian that the vehicle is changing speed.

As yet a further example, first operational information, e.g., environmental location based information, may indicate that the materials handling vehicle is approaching an intersection. Here, at least one inward facing output is controlled to warn the operator of the intersection. Moreover, second operational information different from the first operational information may be used to generate the second indicator control signal. For instance, the second operational information may comprise the speed and direction of the materials handling vehicle, which is used to illuminate the outward facing lights to alert a worker in the vicinity of the materials handling vehicle.

In still another implementation, the method further comprises generating the first indicator control signal using first operational information and generating the second indicator control signal using second operational information that is different from the first operational information. For instance, the speed from a speed sensor on the materials handling vehicle can be used to inform the vehicle operator that the current operating speed exceeds a designated speed zone by illuminating a white light as an inward facing light, whereas travel direction may be communicated to the outward facing illumination device.

The method may further comprise conceptually constructing an imaginary circle around the vehicle, selecting a tangent, designating lights directed inward of the tangent as inward facing lights for the operator, and designating lights directed outward of the tangent as outward facing lights for targets external to the materials handling vehicle.

Figure 6:
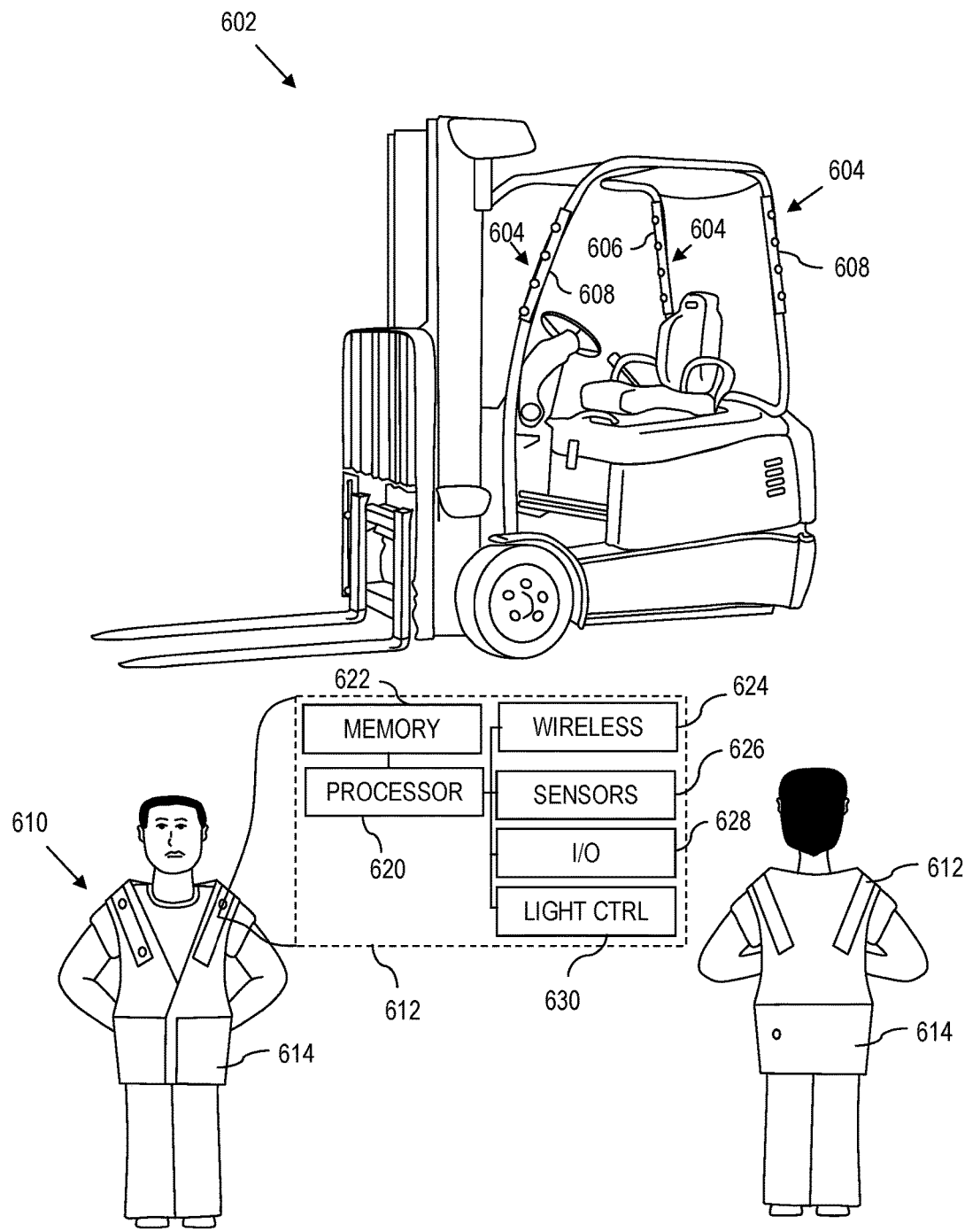
FIG. 6 illustrates workers in the vicinity of a materials handling vehicle, where the workers each wear a vest that communicates information between other workers and/or the materials handling vehicle.

Referring to FIG. 6, a materials handling vehicle 602 includes an operational indicator system as described more fully herein. That is, the materials handling vehicle 602 includes multiple output modules 604 (analogous to output modules 104 described with reference to FIG. 1), which surround the vehicle operator. For instance, each output module 604 includes inward facing outputs 606 and outward facing outputs 608.

Moreover, workers in the vicinity of the materials handling vehicle 602 each wear a communication-enabled vest 610. This can include the operator of the materials handling vehicle 602 as well. Each communication-enabled vest 610 includes a control area 612. The control area is illustrated generally in the shoulder area of the communication-enabled vest 610 for purposes of illustration only. The communication-enabled vest 610 also includes a communication area 614 that includes one or more illumination devices, e.g., an illumination panel, a haptic device, etc.

The control area 612 includes in general, a processor 620 that is coupled to memory 622. The memory 622 can store programs and data collected by the communications-enabled vest 610. The control area 612 also includes a wireless module 624 coupled to the processor 620. For instance, wireless module 624 may include a Bluetooth transceiver for local communication with other communication-enable vests 610, with materials handling vehicles 602, etc. The wireless module 624 may also include a wireless transceiver, e.g., 802.11, for communication with a wireless infrastructure (including the materials handling vehicle 602) within a warehouse environment. As such, the communication-enabled vest 610 can communicate with the materials handling vehicle 602, with a remote server, or combinations thereof.

Still further, in the example embodiment, the control area 612 includes sensors 626 that are connected to the processor 620. For instance, sensors 626 may include accelerometers, gyroscopes, etc. In this regard, the accelerometers can cooperate with the processor 620 to log operator movement, which is stored in the memory 622. The collected movement data can also be uploaded to a remote server, e.g., via the wireless module 624.

The sensors 626 can also include a device such as a camera, tag, reader, or other technology, e.g., in the shoulder area of the vest, to facilitate environmental based location tracking of the worker. In an example, a camera cooperates with the processor, 620 to identify the position of the worker within the environment, e.g., a warehouse. In this regard, the materials handling vehicle 602 may also include a camera, tag, reader, sensor or other technology, to facilitate environmental based location tracking of the materials handling vehicle. Thus, complete environmental awareness of mobile targets can be realized. Moreover, where the operator of the materials handling vehicle 602 wears a communication-enabled vest 610, location awareness of the operator is preserved regardless of whether the operator is on or off the materials handling vehicle 602.

Still further, in the example embodiment, a control area 612 includes input/output (I/O) 628 coupled to the processor 620. The I/O can include speakers near the shoulder area. The provision of speakers eliminates the need to wear a headset or other device that can obscure the hearing of the worker. The I/O can also include a microphone and necessary controls for the microphone. For instance, the microphone can cooperate with the processor 620 and wireless module 624 to implement remote communication.

Still further, the control area 612 can include a light controller 630 that is coupled to the processor 620. The light controller 630 may be necessary to provide the appropriate drivers, buffers, protection circuitry, conversion circuitry, etc., to drive the illumination device(s) provided in the communication area 614.

Each communication-enabled vest 610 also includes a communication area 614 that includes one or more illumination devices, e.g., an illumination panel, a haptic device, etc. As such, the communication-enabled vest 610 can communicate glanceable information to the operator of the materials handling vehicle 602. Moreover, the communication area 614 can provide actionable illumination in a manner analogous to that described with reference to the materials handling vehicle. That is, the communication area 614 can provide illuminated information to others in the vicinity of the worker, and/or the communication area 614 can provide illuminated information to the individual wearing the communication-enabled vest 610.

As a few illustrative examples, a light ring in the communication area 614 can communicate a worker identification, a skill level of the worker, a task assigned to the worker, an indication that the worker completed (or missed) a productivity or other metric. In an example, the processor 620 receives from the wireless module 624, an indication that a materials handling vehicle 602 is approaching. As such, the processor 620 controls the light controller 630 to illuminate the communication area 614 in a manner that alerts the worker (and others around the worker) of the approaching vehicle.

By way of example, assume that the materials handling vehicle is coming around a blind corner. Environmental based location tracking identifies that the worker wearing a communications-enabled vest 610 will be in the vicinity of the materials handling vehicle after the vehicle rounds the corner. As such, the communications-enabled vest 610 informs the operator about the oncoming materials handling vehicle. Moreover, the communication area 614 illuminates a message to the vehicle operator of the materials handling vehicle alerting the vehicle operator of the worker. Thus, the communication-enabled vest 610 augments the inward facing outputs of the indication system described more fully herein.

Thus, while the communication-enabled vest 610 can augment the output devices of the operational indicator component 100, it can also operate autonomously of the operational indicator component 100 on a materials handling vehicle. Still further, the systems of the operational indicator component 100 and the communication-enabled vest can work together to communicate between workers and vehicle operators.

Miscellaneous:

The de-centralized operational indicator system for a materials handling vehicle expands outside the display typically provided on a conventional materials handling vehicle. Moreover, the de-centralized operator indicator system minimizes the need to glance at a display. Still further, the de-centralized operational indicator system facilitates the ability to convey operational information that was not natively supported in the original vehicle display.

Also, the de-centralized operational indicator system facilitates situational awareness both for the operator of the materials handling vehicle, and for targets outside the materials handling vehicle.

In illustrative implementations, light indicators and audio speakers surround the operator. Internal truck lighting is thus formed along the perimeter surrounding the operator. Moreover, light indicators can surround the outside of the vehicle.

The light indicators can be controlled, e.g., through changing the color of the light in response to the actions of the forklift, e.g., turning, slowing down, raising or lowering forks, changing direction of travel, etc.

The indicators can be utilized to communicate direction of travel, location of pedestrians, direction of other vehicles or equipment. The indicators can be utilized to provide operator training, e.g., by alerting the operator of a need to stop, slow down, etc., The indicators can be utilized to indicate when an operator performs a task properly or improperly, e.g., by illuminating a green light for a well executed blend operation or a red light for an improperly implemented blend operation.

In example implementations, the indicators serve as an alert to the vehicle operator of operational issues associated with the materials handling vehicle or to issues with the assigned task, e.g., indicate that the operator is at the wrong pick location, etc. For instance, in an example implementation, the vehicle interface electronically communicates with a native vehicle network bus of the materials handling vehicle to receive information about the operating state of the vehicle directly across the vehicle bus, and accordingly, conveys information, either normal or abnormal, to the operator. As yet another example, the vehicle interface communicates with a processor on the materials handling vehicle that wirelessly receives information from a remote server computer via a wireless connection to convey information to the operator, e.g., to inform the operator that a battery change has been scheduled, that a shift is about to end, that a load is ready to be picked up, etc.

In the examples provided herein, the controller converts the received information at the vehicle interface to situational information regarding at least one of the materials handling vehicle and the environment in which the vehicle is operating. This can further tie into information about the operator, the task being (or about to be) performed by the operator, etc.

In this manner, the controller communicates first situational awareness information to a first output (e.g., a first illumination device), which is intended to inform the operator of the materials handling vehicle as to information relevant to the operation of the materials handling vehicle. Moreover, the controller communicates second situational awareness information to a second output (e.g., a second illumination device), which is intended to inform external targets near the materials handling vehicle as to information relevant to the operation of the materials handling vehicle. Here, the second situational awareness information may be the same as, or different from the first situational awareness information. Moreover, the first and second situational awareness information can be communicated simultaneously (or near simultaneously), or at different times, as the application dictates.

Moreover, the external facing illumination sources can be utilized to communicate information to targets outside the materials handling vehicle. For instance, the external facing illumination devices can be utilized to convey direction of the vehicle, vehicle proximity, vehicle operations, etc.

As best illustrated with reference to FIGS. 3 and 4, there may be at least three output devices, the output devices positioned so as to surround the operator of the materials handling vehicle. For instance, four output devices are illustrated in FIG. 4, each output device having a plurality of lights. Similarly, the surrounding of the operator can be accomplished by one or more strings of output devices that surround or partially surround the operator.

Moreover, the output devices may comprise an operator-oriented sound generator provided with each output module, which is oriented to direct sound into the operating compartment of the materials handling vehicle, and is thus intended to communicate situational information to the operator of the materials handling vehicle. Likewise, an external object warning sound generator may be provided with each output module, which is oriented to direct sound away from the materials handling vehicle, and is thus intended to communicate situational information to external targets remote from, but in proximity to, the materials handling vehicle.

In another illustrative example, an LED array surrounds the power unit of a materials handling vehicle providing external lighting to show pedestrians and others in the vicinity of the materials handling vehicle the intention of the operator, e.g., to convey intent to turn, maintain or change speed or direction, brake, etc.

In an example implementation, the output devices also communicate the intent of the operator to go to a particular location, such as where location tracking is utilized in concert with a warehouse management system. As still further examples, one or more output devices comprise a laser source. In this manner, lasers are used to project the path and direction of the materials handling vehicle. For instance, a laser can project ahead of the materials handling vehicle in the direction of travel to announce that the vehicle is coming, which may be particularly useful on blind corners. In a further example implementation, the color of a laser can change to indicate a change in truck condition, e.g., to indicate a need to slow down for a turn, or otherwise indicate an alteration in vehicle behavior. In yet another example, a laser can be utilized to locate the next pick location on the aisle floor in front of the operator.

The controller is configured to control each output device independently to provide information utilizing different modes of movement, direction of movement, color transition, intensity transition, etc. to convey one or more pieces of information (potentially simultaneously) to both the operator and other targets external to the vehicle.

The controller may be further configured to control each output device independently to provide direction information within the operating compartment, thus providing information intended for the operator of the materials handling vehicle, by controlling the first output (e.g., inward facing first illumination device) of each output module. Also, the controller may control each output module independently to provide direction information external to the materials handling vehicle, thus providing information intended for targets that are external and remote from, but proximate to the materials handling vehicle by controlling the second output (e.g., outward facing second illumination device) of each output module.

Also, as noted in greater detail herein, the operational indicator system may be bidirectional, e.g., by including at least one microphone coupled to the controller for conveying voice commands from the operator of the materials handling vehicle to the communication module.

In still further exemplary implementations, at least one of the first output device and the second output device is integrated into a wearable garment such as a vest that is in wireless communication with the communication module. Still alternatively, a wearable garment having a transceiver therein, may be used for wirelessly communicating information to the controller of the communication module.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A materials handling vehicle comprising:
an operator compartment;
forks that can be raised and lowered to carry a load;
a power unit;
an outward facing output module comprising an indicator directed away from the operator compartment of the materials handling vehicle; and
a controller that receives information from at least one of a remote server, and electronics of the materials handling vehicle, via a materials handling vehicle network bus, where the received information is in regard to a task being performed by the materials handling vehicle;
wherein the controller, responsive to detecting the task being performed, operates the indicator of the outward facing output module to provide situational awareness information with regard to the task.

2. The materials handling vehicle of claim 1, wherein:
the task is a pick operation; and
the controller is operatively programmed to identify that the received information corresponds to the pick operation;
wherein the controller operates the indicator of the outward facing output module to provide situational awareness information with regard to a status of the pick operation.

3. The materials handling vehicle of claim 2, wherein:
the controller is operatively programmed to operate the indicator of the outward facing output module upon detecting that a vehicle operator has stepped out of the operator compartment to perform the pick operation.

4. The materials handling vehicle of claim 1, wherein the controller is operatively programmed to control the indicator of the outward facing output module when the controller determines that the materials handling vehicle has picked up the wrong pallet.

5. The materials handling vehicle of claim 1, wherein the controller is operatively programmed to control the indicator of the outward facing output module to convey information pertaining to an identity of a load on the forks of the materials handling vehicle.

6. The materials handling vehicle of claim 1, wherein the controller is operatively programmed to control the indicator of the outward facing output module to convey information when the controller determines that the operator performed the task improperly.

7. The materials handling vehicle of claim 1, wherein the controller is operatively programmed to control the indicator of the outward facing output module pertaining to at least one of a skill level of the operator of the materials handing vehicle, and an identification of the operator of the materials handling vehicle.

8. The materials handling vehicle of claim 1, wherein the indicator of the outward facing module comprises an illumination device.

9. The materials handling vehicle of claim 1 further comprising a garment that wirelessly pairs to the materials handling vehicle over a short range wireless connection, the garment including an output device that is controlled by the controller to provide situational awareness information.

10. The materials handling vehicle of claim 1, wherein the controller is operatively programmed to control the indicator of the outward facing output module to convey information based upon blending at least two vehicle operating characteristics.

11. The materials handling vehicle of claim 10, wherein the at least two vehicle characteristics include vehicle speed, and at least one of load on forks, obstacles, and warehouse location.

12. The materials handling vehicle of claim 1, wherein the controller is operatively programmed to control the indicator of the outward facing output module to convey information when the controller determines that the materials handling vehicle is due for a battery change.

13. Method of operating a materials handling vehicle comprising:
  providing an outward facing output module comprising an indicator directed away from an operator's compartment of a materials handling vehicle, the materials handling vehicle also having forks that can be raised and lowered to carry a load, and a power unit;
  receiving information by a controller on the materials handling vehicle, wherein the information is received from at least one of a remote server, and electronics of the materials handling vehicle, via a materials handling vehicle network bus, where the received information is in regard to a task being performed by the materials handling vehicle;
  converting, by the controller, the received information into situational awareness information relevant to the task;
  detecting, by the controller, that the materials handling vehicle is involved in performing the task; and
  operating, responsive to detecting the task being performed, the indicator of the outward facing output module to provide situational awareness information with regard to the task.

14. The method of claim 13, wherein:
  converting, by the controller, the received information into situational awareness information relevant to the task, comprises:
    detecting that the task is a pick operation; and
    controlling the indicator of the outward facing output module to provide situational awareness information with regard to a status of the pick operation.

15. The method of claim 13, further comprising:
  detecting that an operator of the materials handling vehicle has stepped out of the operator compartment to perform the pick operation.

16. The method of claim 13, wherein:
  converting, by the controller, the received information into situational awareness information relevant to the task, comprises:
    detecting that the task is to pick up a pallet, and that an operator has picked up the wrong pallet; and
    controlling the indicator of the outward facing output module to provide situational awareness information that the wrong pallet has been picked up.

17. The method of claim 13, wherein:
  converting, by the controller, the received information into situational awareness information relevant to the task, comprises:
    detecting an identity of a load on the forks of the materials handling vehicle; and
    controlling the indicator of the outward facing output module to provide situational awareness information of the identity of the load.

18. The method of claim 13, wherein:
  converting, by the controller, the received information into situational awareness information relevant to the task, comprises:
    detecting that an operator has performed the task improperly; and
    controlling the indicator of the outward facing output module to provide situational awareness information that the task has been performed improperly.

19. The method of claim 13, wherein:
  converting, by the controller, the received information into situational awareness information relevant to the task, comprises utilizing at least one of a rules engine and a state machine to process at least one variable stored by the materials handling vehicle according to a data object model associated with the materials handling vehicle.

20. The method of claim 19, wherein utilizing at least one of a rules engine and a state machine to process at least one variable comprises detecting at least one of a state of a select variable and a state change of the select variable.

* * * * *